United States Patent

Yamashita et al.

[11] Patent Number: 6,085,518
[45] Date of Patent: Jul. 11, 2000

[54] AIR-FUEL RATIO FEEDBACK CONTROL FOR ENGINES

[75] Inventors: Yukihiro Yamashita; Shujiro Morinaga; Hisashi Iida, all of Kariya; Hidenobu Muto, Obu, all of Japan

[73] Assignee: Denso Corporation, Kariya, Japan

[21] Appl. No.: 09/144,270

[22] Filed: Aug. 31, 1998

[30] Foreign Application Priority Data

Sep. 2, 1997 [JP] Japan .................................. 9-237317

[51] Int. Cl.$^7$ ...................................................... F01N 3/00
[52] U.S. Cl. .............................................. 60/276; 60/274
[58] Field of Search ............................. 60/274, 276, 277

[56] References Cited

U.S. PATENT DOCUMENTS

| | | | |
|---|---|---|---|
| 5,090,199 | 2/1992 | Ikuta et al. | 60/276 |
| 5,542,248 | 8/1996 | Iwata et al. | 60/276 |
| 5,619,852 | 4/1997 | Uchikawa | 60/276 |
| 5,758,494 | 6/1998 | Davey | 60/274 |
| 5,762,055 | 6/1998 | Yamashita et al. | 123/677 |
| 5,797,261 | 8/1998 | Akazaki et al. | 60/276 |
| 5,851,376 | 12/1998 | Nishioka et al. | 205/784.5 |

FOREIGN PATENT DOCUMENTS

| | | |
|---|---|---|
| 0 312 835 | 4/1989 | European Pat. Off. . |
| 63-111252 | 5/1988 | Japan . |
| 2-2518254 | 5/1996 | Japan . |
| 9-88683 | 3/1997 | Japan . |

*Primary Examiner*—Henry C. Yuen
*Assistant Examiner*—Arnold Castro
*Attorney, Agent, or Firm*—Nixon & Vanderhye P.C.

[57] ABSTRACT

An air-fuel ratio feedback control has an air-fuel ratio sensor and an oxygen sensor at an upstream side and a downstream side of a catalytic converter. A CPU feedback controls an air-fuel ratio detected by the air-fuel ratio sensor to a target air-fuel ratio, with a feedback gain being varied with an output of the oxygen sensor. The CPU further estimates an air-fuel ratio response speed based on a ratio between an exhaust gas flow amount and a capacity of the catalyst and determines a rate of deterioration of the catalyst. The CPU varies further the feedback gain based on the estimated response speed and the determined rate of deterioration.

12 Claims, 7 Drawing Sheets

AIR-FUEL RATIO FEEDBACK CONTROL FOR ENGINES

CROSS REFERENCE TO RELATED APPLICATION

This application relates to and incorporates herein by reference Japanese Patent Application No. 09-237317 filed on Sep. 2, 1997.

BACKGROUND OF THE INVENTION

1. Field of the Invention

The present invention relates to an air-fuel ratio feedback control for an engine which executes an air-fuel ratio feedback control of air-fuel mixture based on air-fuel ratio detection results of air-fuel ratio sensors disposed at both upstream and downstream sides of a catalytic converter.

2. Related Art

A conventional air-fuel ratio control system for engines executes an air-fuel ratio feedback control of air-fuel mixture to be supplied to an engine, based primarily on the air-fuel detection result of an air-fuel ratio (A/F) sensor disposed at the upstream side of a catalytic converter. However, component parts of the system, such as air-fuel ratio sensors and fuel injection valves, have variations in the operation characteristics that occurs at the time of production and/or during use. This results in errors in the conventional air-fuel ratio feedback control.

It is therefore proposed to provide a dual sensor system which uses an air-fuel ratio sensor additionally at the downstream side of the catalytic converter, so that the air-fuel ratio feedback control is executed based also on the air-fuel ratio detection result of the downstream air-fuel ratio sensor.

In such a dual sensor system as disclosed in Japanese Patent No. 2518254, for instance, air-fuel ratio feedback control gain is set variably in accordance with a parameter such as an intake air amount, engine rotational speed or intake air pressure which represents an exhaust gas transport delay. As the exhaust gas transport delay causes a delay in the air-fuel ratio detection at the downstream side of the catalytic converter, it is disadvantageous to the air-fuel ratio feedback control. Therefore, in the above dual sensor system, speed of varying the feedback control gain is set larger as the exhaust gas transport delay becomes large. Although this dual sensor system reduces the feedback control error resulting from the exhaust gas transport delay, it is not sufficient to control the air-fuel ratio accurately.

SUMMARY OF THE INVENTION

It is an object of the present invention to improve an air-fuel ratio feedback control for a higher control accuracy.

The present invention is based on the finding that a delay in air-fuel ratio (A/F) detection at a catalyst downstream side results not only from an exhaust gas transport delay but also from other parameters which influence on the catalytic reaction in a catalytic converter. It is ascertained through experiments that a delay caused by the catalytic reaction in the catalytic converter amounts to as long as several seconds, while a delay caused by the exhaust gas transport is as short as several hundreds milliseconds.

Thus, according to the present invention, a response speed of air-fuel ratio at a catalyst downstream side relative to air-fuel ratio at a catalyst upstream side is detected as a parameter indicative of a catalytic reaction delay in a catalytic converter so that an air-fuel ratio feedback control is corrected thereby, for instance, by varying a feedback control gain based on the detected response speed of the air-fuel ratio. Preferably, the control gain is determined based on a detection output of a downstream-side air-fuel ratio and corrected by the detected response speed. More preferably, the feedback gain is varied based on air-fuel ratio feedback speed which follows air-fuel ratio changes.

Specifically, the response speed is estimated from an SV ratio between exhaust gas flow amount (velocity V) and catalyst volume (space S). More specifically, the control gain is corrected further based on a deterioration rate of the catalytic converter. This deterioration rate is determined by an integration of changes of the control gain caused by the output of the air-fuel ratio sensor at the downstream side of the catalytic converter.

BRIEF DESCRIPTION OF THE DRAWINGS

Other objects, features and advantages of the present invention will become more apparent from the following detailed description made with reference to the accompanying drawings. In the drawings.

DETAILED DESCRIPTION OF THE PREFERRED EMBODIMENT

Figure 1:
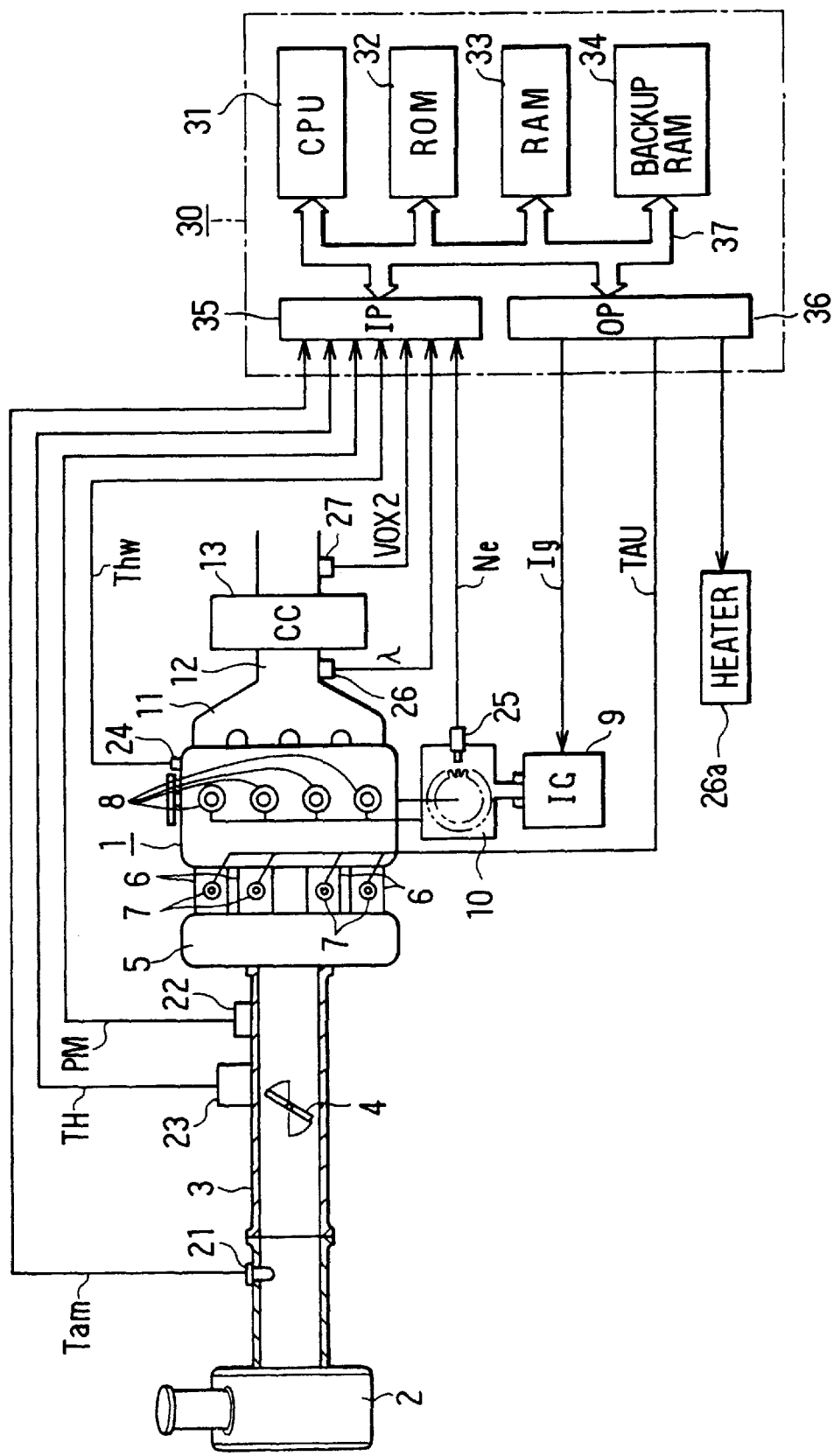
FIG. 1 is a schematic view showing an air-fuel ratio feedback control system for engines according to an embodiment of the present invention.

In a preferred embodiment, as shown in FIG. 1, an internal combustion engine 1 is four-cylinder, four-cycle spark-ignited engine type. Inside the engine 1, intake air flows through an air cleaner 2, an intake pipe 3, a throttle valve 4, a surge tank 5 and intake manifolds 6 from upstream to downstream. Inside each intake manifold 6, the intake air is mixed with fuel injected by each injection valve 7 to form air-fuel mixture of a predetermined air-fuel ratio (A/F) to be supplied to each cylinder. An ignition plug 8 attached to each of the cylinders of the engine 1 is supplied with a high voltage from an ignition circuit (IG) 9 via a distributor 10. With the high voltage, the ignition plug ignites the air-fuel mixture in each cylinder at suitably timed intervals. After combustion, exhaust gas passes through exhaust manifolds 11 and an exhaust pipe 12. A catalytic converter (CC) 13 containing a three-way catalyst is attached to the exhaust pipe 12 to remove noxious components (CO, HC, NOx, etc.) from the exhaust gas through catalytic reaction therein before it is discharged into the atmosphere.

The intake pipe 3 is furnished with an intake air temperature sensor 21 and an intake air pressure sensor 22. The intake air temperature sensor 21 detects temperature of intake air (Tam), the intake air pressure sensor 22 detects pressure of intake air (PM) downstream of the throttle valve 4. The throttle valve 4 is equipped with a throttle sensor 23 for detecting the throttle opening angle (TH) of the throttle valve 4. The throttle sensor 23 outputs an analog signal indicative of the opening angle TH. The throttle sensor 23 is constructed to output detection signals indicating that the throttle valve 4 is opened and closed substantially fully, respectively.

The cylinder block of the engine 1 includes a coolant temperature sensor 24 that detects the temperature of the water coolant (Thw) inside the engine 1. The distributor 10 is provided with a rotational speed sensor 25 for detecting the rotational speed (Ne) of the engine 1. The rotational speed sensor 25 outputs 24 pulse signals for two engine crankshaft rotations or 72° CA.

Figure 2:
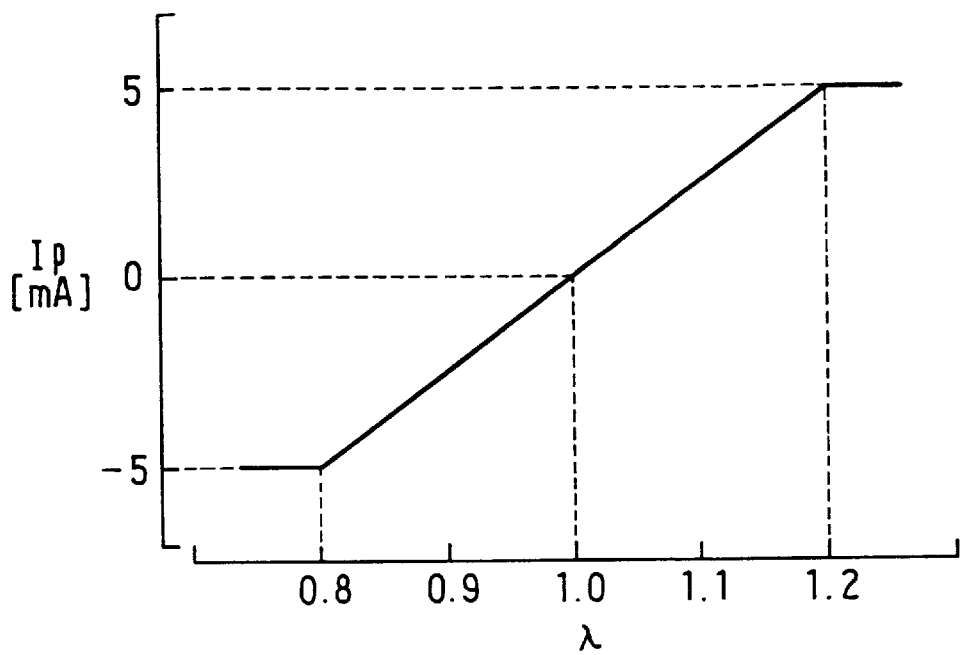
FIG. 2 is a graph showing an output characteristics of an air-fuel ratio sensor used in the embodiment.

An air-fuel ratio sensor (upstream sensor) 26 is provided upstream of the catalytic converter 13 attached to the exhaust pipe 12. The air-fuel ratio sensor 26 outputs, as shown in FIG. 2, linear output current Ip changing linearly with the air-fuel ratio $\lambda$ (oxygen concentration or carbon monoxide concentration in the exhaust gas from the engine) over a wide range of air-fuel ratio ($\lambda$=0.8 to 1.2). The air-fuel ratio sensor 26 comprises a solid electrolyte of zirconium dioxide ($ZrO_2$) coated with a diffusion resistance layer thereover. It has a heater 26a which promotes activation of the solid electrolyte.

Figure 3:
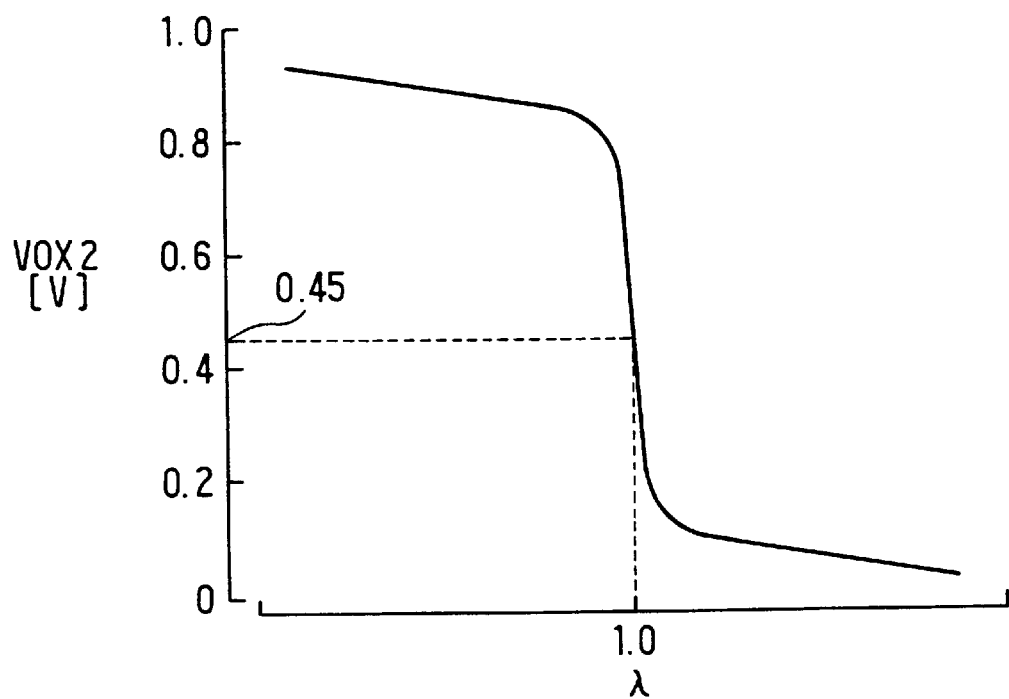
FIG. 3 is a graph showing an output characteristics of an oxygen sensor used in the embodiment.

Downstream of the catalytic converter 13 is a downstream oxygen sensor (downstream sensor) 27. The sensor 27 also comprises a solid electrolyte of zirconium dioxide ($ZrO_2$) as an electromotive force generating type. The sensor 27 outputs, as shown in FIG. 3, a voltage Vox2 which changes its output voltage stepwise between 1.0 volt and 0 volt depending on whether the air-fuel ratio $\lambda$ is on the rich or lean side of the stoichiometric air-fuel ratio ($\lambda$=1).

An electronic control unit (ECU) 30 is provided to control operation of the engine 1. The ECU 30 is designed to be a logic operation circuit comprising mainly a CPU (central processing unit) 31, a ROM (read-only memory) 32, a RAM (random access memory) 33 and a backup RAM 34. These circuits are connected to input port (IP) 35 and an output port (OP) 36 via a bus 37. The input port 35 receives detection signals from various sensors, and the output port 36 outputs control signals to various actuators such as ignition circuit 9, injection valves 7 and heater 26a. Through the input port 35, the ECU 30 receives such data as the intake air temperature Tam, intake air pressure PM, throttle opening TH, coolant temperature Thw, engine rotational speed Ne and the air-fuel ratio signals $\lambda$ and Vox2. Receiving those signals, the ECU 30 executes a fuel injection control routine to calculate fuel injection amount TAU, ignition timing Ig and other control data. The control signals thus calculated are output via the output port 36 to the fuel injection valves 7 and the ignition circuit 9.

Figure 4:
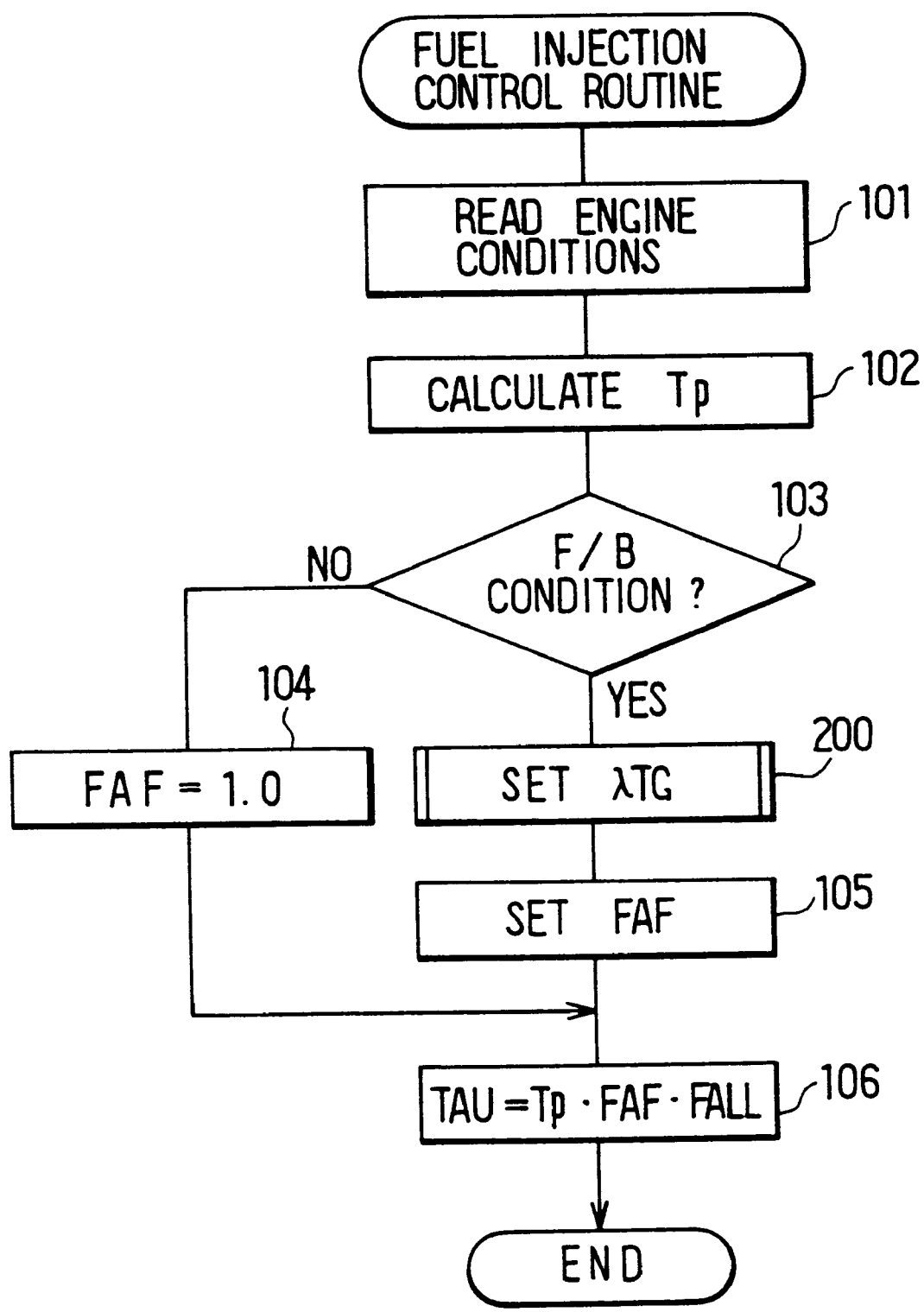
FIG. 4 is a flow chart showing a fuel injection control routine executed in the embodiment.

The CPU 31 is programmed to execute the fuel injection control routine of FIG. 4 at every fuel injection timing (every 180° CA angular rotation). The CPU 31 first reads detected engine conditions such as Tam, TH, PM, Ne, Thw and Ne, and calculates a basic fuel injection amount Tp in step 102. The basic fuel injection amount Tp may be calculated by use of fuel injection amount data map stored in the ROM 32 in accordance with the detected engine speed Ne and the intake air pressure PM. In step 103, the CPU checks if the feedback condition of the air-fuel ratio A is satisfied. As known well, the feedback condition is met when the coolant temperature Thw is higher than a predetermined temperature, the engine 1 is not in a high load nor high speed condition, and the Air-fuel ratio sensor 26 is in an activated state.

If the feedback condition is not satisfied (NO), the CPU 31 sets in step 104 air-fuel ratio feedback correction value FAF to 1.0 indicative of open-loop control (no feedback control). If the feedback condition is satisfied (YES), the CPU 31 sets in step 200 a target air-fuel ratio $\lambda$TG for the feedback control to control the air-fuel ratio $\lambda$ to the target air-fuel ratio $\lambda$TG. Then, the CPU 31 sets variably the feedback correction value FAF in step 105 based on a difference between the target air-fuel ratio $\lambda$TG and the actually detected air-fuel ratio $\lambda$.

The feedback correction value FAF is calculated by use of the following equations (1) and (2). This calculation of the feedback correction value FAF is well known in the art (for instance, by JP-A 1-110853) and hence no detailed description is made for brevity.

$$FAF = K1 \times \lambda + K2 \times FAF1 + \ldots + Kn+1 \times FAFn + ZI \qquad (1)$$

$$ZI = ZI1 + Ka \times (\lambda TG - \lambda) \qquad (2)$$

In the above equations (1) and (2), $\lambda$ is a converted value of the limit current of the air-fuel ratio sensor 26 to the air-fuel ratio, K1 to Kn+1 is air-fuel ratio feedback constant (gain), ZI is an integral term, Ka is an integral term. Suffixes 1 to n+1 are variables representing the number of times feedback control is effected from the start of the first sampling.

After setting the FAF, the CPU 31 calculates in step 106 a fuel injection amount TAU from the basic fuel injection amount Tp, air-fuel ratio feedback correction value FAF and other correction values FALL corresponding to coolant temperature, air conditioner load and the like, by use of the following equation (3).

$$TAU = Tp \times FAF \times FALL \qquad (3)$$

After calculating the fuel injection amount TAU, the CPU 31 outputs the fuel control signal corresponding to the calculated TAU to the fuel injection valves 7, thus completing the fuel injection control routine.

Figure 5:
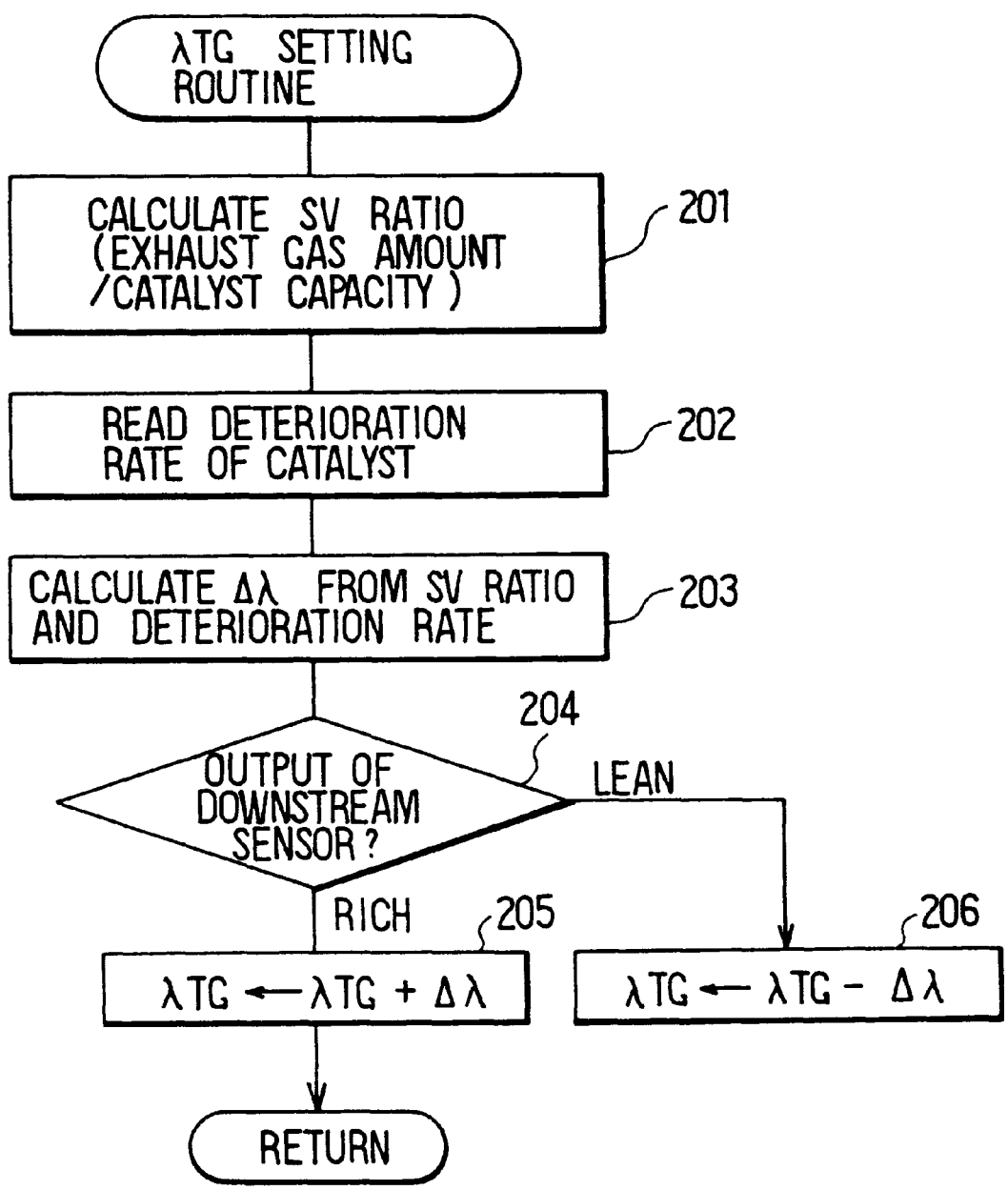
FIG. 5 is a flow chart showing a target air-fuel ratio setting routine executed in the embodiment.

The target air-fuel ratio $\lambda$TG (step 200 in FIG. 4) is determined as shown in FIG. 5. in response to the output voltage Vox2 of the downstream oxygen sensor 27. More specifically, in this embodiment, a change $\Delta\lambda$ (feedback speed) for updating the target ratio $\lambda$TG is set variably in accordance with a response speed of the air-fuel ratio at the catalyst downstream relative to the air-fuel ratio at the catalyst upstream (catalyst upstream/downstream air-fuel ratio response speed). It is to be noted that the response speed is used as a parameter indicative of the catalytic reaction delay in the catalytic converter 13.

Figure 6:
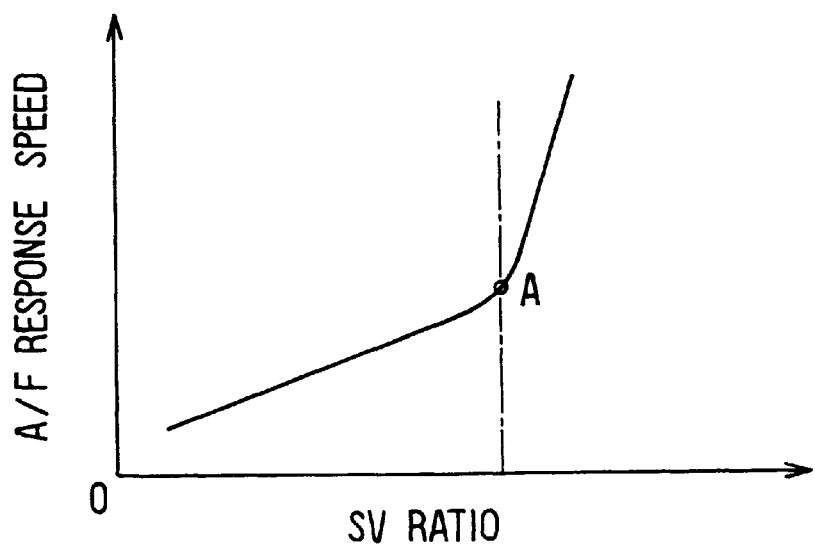
FIG. 6 is a graph showing a relation between an SV ratio and an air-fuel ratio response speed.

Referring to FIG. 5, the CPU 31 first calculates in step 201 a SV (space velocity) ratio from the exhaust gas amount and the catalyst capacity (volume) as a parameter which represents the upstream/downstream air-fuel ratio response speed. This SV ratio may be calculated by dividing the exhaust gas flow amount (V) changing from time to time by a fixed capacity (S) of the catalyst. As shown in FIG. 6, the SV ratio and the upstream/downstream air-fuel ratio response speed is in a fixed relation. That is, as the SV ratio increases, the air-fuel ratio response speed increases. Further, as the SV ratio exceeds a certain point A, the rate of increase in the air-fuel ratio response speed increases. That is, as the exhaust gas flow amount increases and the exhaust purifying ability of the catalyst per unit time in the converter 13 increases above a certain level, the exhaust gas passes through the converter 13 without being not purified by the catalyst reaction, resulting in the air-fuel ratio response speed.

The exhaust gas flow amount is generally proportional to an intake air amount of the engine determined by the engine rotational speed Ne and the intake air pressure PM. Therefore, the exhaust gas flow amount is calculated from the rotational speed Ne and the air pressure PM in this embodiment. However, it may of course be determined by other ways, such as by using a gas flow meter in the exhaust passage.

Figure 8:
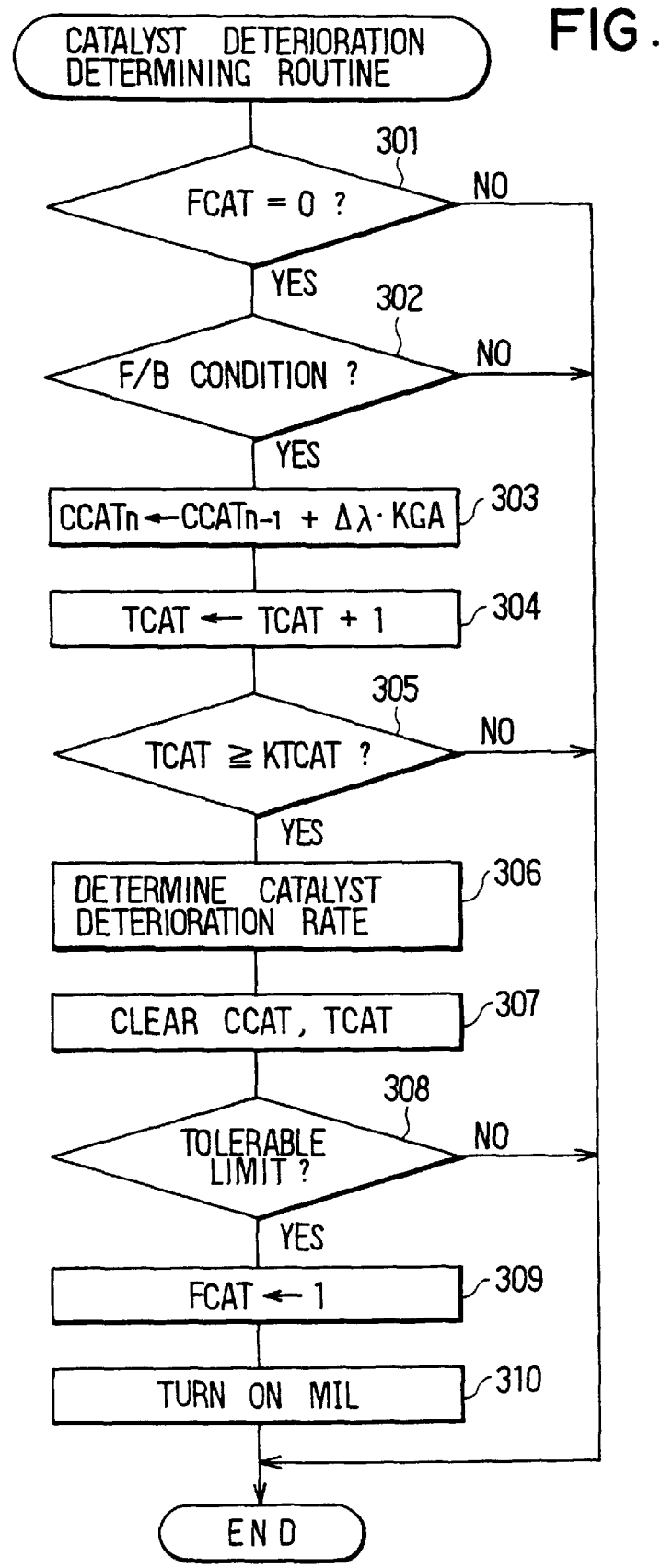
FIG. 8 is a flow chart showing a catalyst deterioration determining routine executed in the embodiment.

The CPU 31 then reads in step 202 a catalyst deterioration rate which may be determined by a catalyst deterioration determining routine shown in FIG. 8.

The CPU 31 calculates in step 203 a change $\Delta\lambda$ to be used for updating the target air-fuel ratio $\lambda$ based on the calculated SV ratio and the deterioration rate. The change $\Delta\lambda$ defines air-fuel ratio feedback (F/B) speed at that moment and may be determined by use of a data map shown in FIG. 7. The change $\Delta\lambda$ is set larger, as the SV ratio increases or the deterioration rate increases. Here, the $\Delta\lambda$-characteristics which changes with the SV ratio is determined based on the relation shown in FIG. 6.

Thereafter, based on the output voltage Vox2 of the downstream oxygen sensor 27, the CPU 31 checks in step 204 if the present air-fuel ratio $\lambda$ is in the fuel-rich side or in the fuel-lean side from the target air-fuel ratio ($\lambda$TG=1 in this embodiment). If the present air-fuel ratio is in the rich side, the CPU 31 adds the change $\Delta\lambda$ to the target air-fuel ratio $\lambda$TG in step 205 so that the target air-fuel ratio is shifted to be leaner in fuel. If the present air-fuel ratio is in the lean side, the CPU 31 subtracts the change $\Delta\lambda$ from the target air-fuel ratio $\lambda$TG instep 206 so that the target air-fuel ratio is shifted to be richer in fuel.

The catalyst deterioration is determined by the routine shown in FIG. 8 which is executed at every fixed predetermined interval, e.g., 64 ms.

In this routine, the CPU 31 checks instep 301 if a catalyst deterioration flag FCAT is 1 or not. This flag FCAT is for indicating whether the catalyst in the catalytic converter 13 has deteriorated to the tolerable limit. It is initialized to FCAT=0 (not deteriorated to the tolerable limit). The CPU 31 checks in step 302 whether the engine 1 is in the air-fuel ratio feedback condition. With determination of NO in either step 301 or 302, the CPU 31 ends this routine.

With determinations of YES in both steps 301 and 302, on the other hand, the CPU 31 calculates in step 303 an integration value CCAT of $\Delta\lambda$ (feedback speed) as follows.

$$CCATn = CCATn-1 + \Delta\lambda \times KGA \qquad (4)$$

Figure 9:
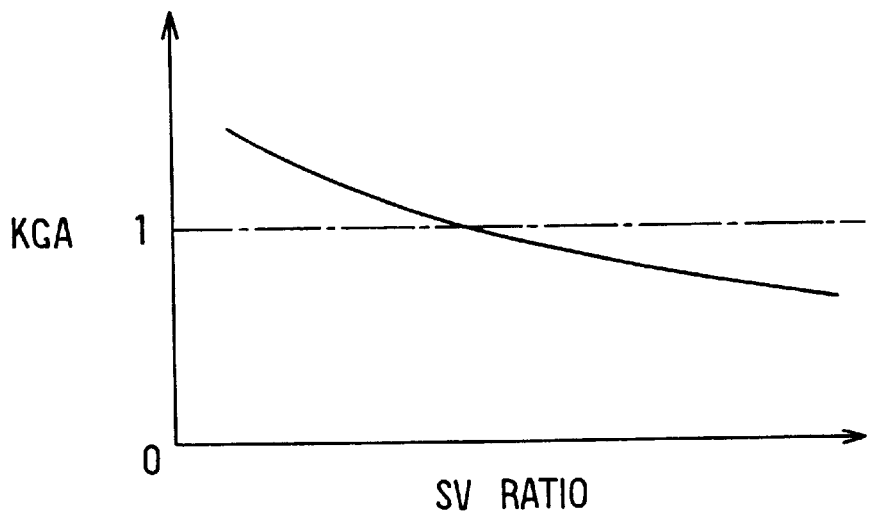
FIG. 9 is a graph showing a relation between the SV ratio and a coefficient KGA calculated in the embodiment.

In this equation (4), suffixes n and n−1 represent a present calculation cycle and a previous calculation cycle, respectively. KGA represents a coefficient which varies with the engine operating condition. For instance, it is set to a smaller value as the SV ratio (exhaust gas flow amount/catalyst capacity) is larger as shown in FIG. 9. By multiplying the coefficient KGA and $\Delta\lambda$, the variation of $\Delta\lambda$ caused by changes in the response speed of the downstream oxygen sensor 27 is reduced even when the response speed of the oxygen sensor 27 changes with changes in the engine operating condition.

The CPU 31 increments a counter TCAT indicative of elapsed time in step 304, and checks in the following step 305 whether the counter TCAT has reached a reference KTCAT which corresponds to about 10 seconds With determination of NO in step 305, the CPU 31 ends this routine.

Figure 10:
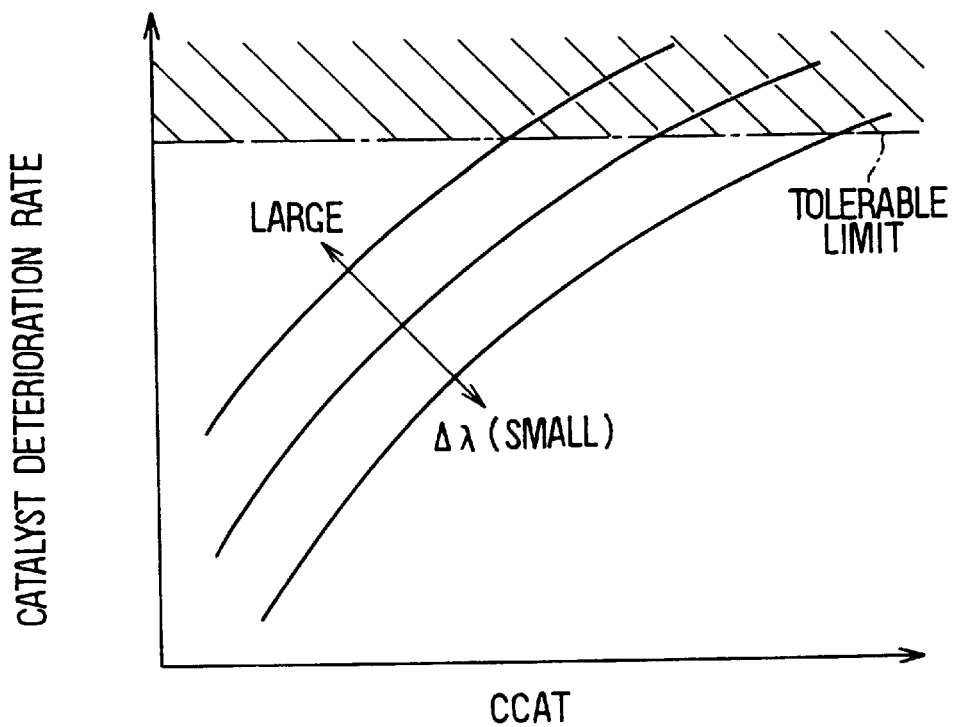
FIG. 10 is a graph showing a relation among a CCAT, the feedback speed and the catalyst deterioration rate.

With determination of YES in step 305, the CPU 31 determines the deterioration rate in step 306 based on the integrated value CCAT. Specifically, as shown in FIG. 10, deterioration characteristics curves are set so that the catalyst deterioration rate increases as the integrated value CCAT of $\Delta\lambda$ increases. Those deterioration characteristics curves may be used selectively based on the value of $\Delta\lambda$ (feedback speed). The tolerable limit of deterioration relative to the integrated value CCAT is set higher so that the deterioration determination level is maintained unchanged relative to changes in $\Delta\lambda$. If the integrated value CCAT increases excessively, the deterioration rate reaches the tolerable limit (hatched area in the figure).

After determination of the catalyst determination, the CPU 31 clears both integrated value CCAT and counter TCAT to 0 in step 307. After this clearing, the CCAT and TCAT values are incrementally integrated from 0, so that the above deterioration determining processing may be repeated.

The CPU 31 checks in step 308 whether the catalyst deterioration rate determined in step 306 exceeds the tolerable limit (hatched range in FIG. 10). With determination of NO in step 308, the CPU 31 ends this routine. With determination of YES, on the other hand, the CPU 31 sets the deterioration flag FCAT to 1 and turns on a malfunction indicator light (MIL).

Figure 7:
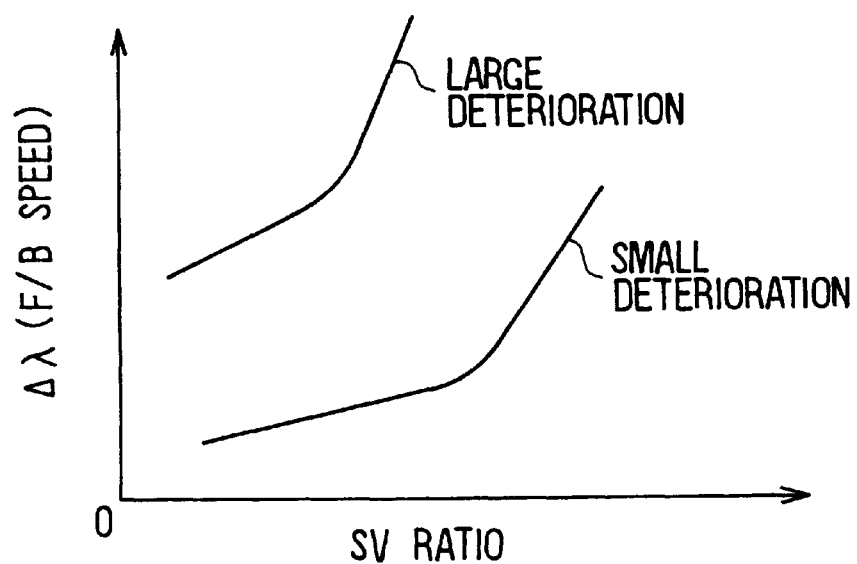
FIG. 7 is a data map to be used in the embodiment and showing a relation among the SV ratio, catalyst deterioration rate and air-fuel ratio feedback speed.

The deterioration rate determined as above is used in the target air-fuel ratio setting routine of FIG. 5, specifically in step 202, so that the change $\Delta\lambda$ for updating the target $\lambda$TG, by the use of characteristics shown in FIG. 7.

The above embodiment has the following advantages.

(a) The catalyst upstream/downstream air-fuel ratio response speed (response speed of air-fuel ratio at the catalyst downstream relative to the catalyst upstream) is estimated based on the SV ratio between the catalyst capacity (S) and the exhaust gas flow amount (V). The target air-fuel ratio $\lambda$TG (feedback gain) is varied in accordance with the estimated catalyst upstream/downstream air-fuel ratio response speed when it is set based on the detection output of the downstream oxygen sensor 27. Therefore, the target air-fuel ratio $\lambda$TG can be set to follow changes in the actual air-fuel ratio. Thus, accuracy of the feedback control can be increased in the dual sensor system using two air-fuel ratio sensors 26 and 27, by eliminating control errors which might be caused by the response delay at the catalyst downstream side.

(b) The catalyst upstream/downstream air-fuel ratio response speed (response delay) is directly used to set the feedback gain. Therefore, even when the purifying ability of the catalyst is in saturation and the air-fuel ratio response speed increases remarkably in excess of the limit of purifying ability of the catalyst, the feedback control can be maintained appropriately meeting such a condition.

(c) As the catalyst upstream/downstream air-fuel ratio response speed is estimated from the SV ratio, the feedback control can be executed by the parameter which represents both the exhaust gas transport delay and the exhaust gas reaction delay in the catalytic converter 13.

(d) The deterioration rate of the catalyst is determined, and this deterioration rate is used as a parameter to set the change $\Delta\lambda$ (feedback speed). In this instance, even when the air-fuel ratio response speed changes depending on the deterioration of the catalyst, the feedback control can be attained highly accurately.

(e) The change Δλ which corresponds to a change in the feedback gain is integrated or accumulated, and the rate of catalyst deterioration is determined higher as the integrated value is larger. Further, the catalyst deterioration is indicated when the rate of deterioration exceeds the tolerable limit. This provides a novel method of determining the rate of catalyst deterioration, which improves the accuracy of control when applied to the air-fuel ratio feedback control.

(f) As the integrated value CCAT of the change Δλ is used to determine the rate of catalyst deterioration, error in determining the deterioration can be reduced even when the engine operating condition changes temporarily. Further, as the coefficient KGA corresponding to the engine operating condition is multiplied each time the change Δλ is integrated, error in the integrated value CCAT is less likely to be caused by changes in the engine operating condition.

The above embodiment may be modified as follows.

Although the change Δλ which corresponds to the feedback speed is set based on the SV ratio and the rate of catalyst deterioration, it may be set only from the SV ratio, thereby eliminating the catalyst deterioration determining routine.

Although the feedback gain is varied by varying the target air-fuel ratio λTG, it may be varied by varying the feedback constants K1 to Kn+1 or the integral constant Ka used in the equations (1) and (2) for calculation the feedback correction value FAF.

Although the linear output type air-fuel ratio sensor and oxygen sensor are provided at the upstream side and the downstream side of the catalytic converter, the linear output type air-fuel ratio sensor may be replaced by another oxygen sensor and the feedback control may be executed by the proportional-integral control. In this instance, the proportional control amount, integral constant and delay time, which correspond to the feedback gain, may be set variably based on the SV ratio. The catalyst deterioration may be made based on a parameter calculated by integration of the proportional amount, integral constant or the delay time.

Although the catalyst upstream/downstream air-fuel ratio response speed is calculated from the SV ratio, it may be estimated by a measurement of the change in the air-fuel ratio at the catalyst downstream side at the time of change in the air-fuel ratio at the catalyst upstream side. Further, it is also possible to change the fuel injection amount during stable or normal operation of the engine and to estimate the air-fuel ratio response speed from a resulting change in the air-fuel ratio at the catalyst downstream side or from a resulting response delay time. Thus estimated air-fuel ratio response speed may be used to vary the feedback control gain.

As the catalyst deteriorates progressively to lower its storage ability, the downstream oxygen sensor responds more quickly relative to the air-fuel ratio at the catalyst upstream side. Therefore, the rate of catalyst deterioration may be determined from the number of times of output rich/lean level changes of the downstream oxygen sensor or from the period of output level change of the same. Further, as disclosed in JP-A-9-4438, the rate of catalyst deterioration may be determined based on a heat amount required from engine starting to activation of a catalyst.

The present invention should not be limited to the disclosed embodiment and its modifications but may be implemented by further modifications and changes without departing from the spirit of the invention.

What is claimed is:

1. An air-fuel ratio control system for an engine having an air-fuel ratio sensor disposed downstream of a catalytic converter, said system comprising:
   closed loop feedback control means connected to control fuel input to the engine based at least in part on output of said downstream air-fuel ratio sensor during predetermined engine-operating conditions; and
   means for varying feedback gain of said control means at least in part in response to variations in time delay caused by detected variations in the speed of catalytic reactions in said catalytic converter.

2. An air-fuel ratio control method for an engine having an air-fuel ratio sensor disposed downstream of a catalytic converter, said method comprising:
   performing closed loop feedback control of fuel input to the engine based at least in part on output of said downstream air-fuel ratio sensor during predetermined engine-operating conditions; and
   varying feedback gain of said feedback control at least in part in response to time delay variations caused by detected variations in the speed of catalytic reactions in said catalytic converter.

3. An air-fuel ratio control system for an engine having a catalytic converter for purifying exhaust gas, the system comprising:
   an upstream air-fuel ratio sensor provided at an upstream side of the catalytic converter;
   a downstream air-fuel ratio sensor provided at a downstream side of the catalytic converter;
   feedback control means for feedback controlling an air-fuel ratio of mixture to a target air-fuel ratio based on an air-fuel ratio detected by the upstream air-fuel ratio sensor, with a feedback gain being set in response to an air-fuel ratio detected by the downstream air-fuel ratio sensor;
   response speed detecting means for detecting a response speed of the air-fuel ratio at the downstream side relative to the air-fuel ratio at the upstream side; and
   gain varying means for varying the feedback gain based on the detected response speed.

4. The control system as in claim 3, wherein:
   the gain varying means varies the feedback gain based on a feedback speed which follows a change in the air-fuel ratio.

5. The control system as in claim 3, wherein:
   the response speed detecting means detects the response speed by an estimation of a ratio between an exhaust gas flow amount and a capacity of the catalytic converter.

6. The control system as in claim 3, further comprising:
   deterioration determining means for determining a rate of deterioration of the catalytic converter,
   wherein the gain varying means varies the feedback gain based on the determined rate of deterioration.

7. The control system as in claim 6, wherein the deterioration determining means includes:
   integrating means for integrating a value corresponding to a feedback gain change set based on an output of the downstream air-fuel ratio sensor,
   wherein the rate of deterioration is increased as the integrated value increases.

8. The control system as in claim 6, wherein:
   the deterioration determining means has an indicator for indicating that the catalytic converter has deteriorated to a tolerable limit of deterioration.

9. The control system as in claim 3, wherein:

the gain varying means varies the target air-fuel ratio of the feedback control means.

10. An air-fuel ratio control method for an engine having an air-fuel ratio sensor for detecting an air-fuel ratio and a catalytic converter disposed upstream of the air-fuel sensor for purifying exhaust gas before it reaches the sensor, the control method comprising:

executing a feedback control to attain a target air-fuel ratio of mixture to be supplied to the engine in response to the air-fuel ratio detected by the air-fuel ratio sensor;

estimating a parameter indicative of delay in reaction of the exhaust gas in the catalytic converter; and correcting the feedback control based on the estimated parameter.

11. The control method as in claim 10, wherein:

the estimating step estimates the parameter from a ratio between an exhaust gas flow amount and a capacity of the catalytic converter.

12. The control method as in claim 10, further comprising:

determining a rate of deterioration of the catalytic converter, wherein the correcting step corrects the feedback control based further on the determined rate of deterioration.

* * * * *